US004001720B2

United States Statutory Invention Registration [19]

[11] Reg. Number: H1720

Chen

[45] Published: Apr. 7, 1998

[54] TIME FREQUENCY PROCESSOR FOR RADAR IMAGING OF MOVING TARGETS

[76] Inventor: Victor C. Chen, 2706 Shawn Leigh Dr., Vienna, Va. 22181

[21] Appl. No.: 829,263

[22] Filed: Mar. 31, 1997

[51] Int. Cl.[6] ..... G01S 13/89

[52] U.S. Cl. ..... 342/25; 342/179

*Primary Examiner*—Daniel T. Pihulic

[57] ABSTRACT

Conventional radar uses the Fourier transform to generate a radar target image. Constraints on the use of Fourier methods requiring point scatterers to remain in their range cells and requiring Doppler frequency shifts for point scatterers to be stationary are impractical due to a moving object's inherent non-uniform motion and rotation. Time varying motion-induced Doppler frequency shift spectra represented with Fourier transform methods smears radar target image. Representing time-varying Doppler spectrum using joint time-frequency transform methods is desirable. Replacing conventional radar Fourier transform with a high resolution time-frequency transform, a 2-D range-Doppler Fourier image frame becomes a 3-D time-range-Doppler cube. By sampling in time, a time sequence of 2-D range-Doppler images with superior resolution can be viewed. Smears from time-variance of Doppler spectrum may be removed to enhance target image.

11 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

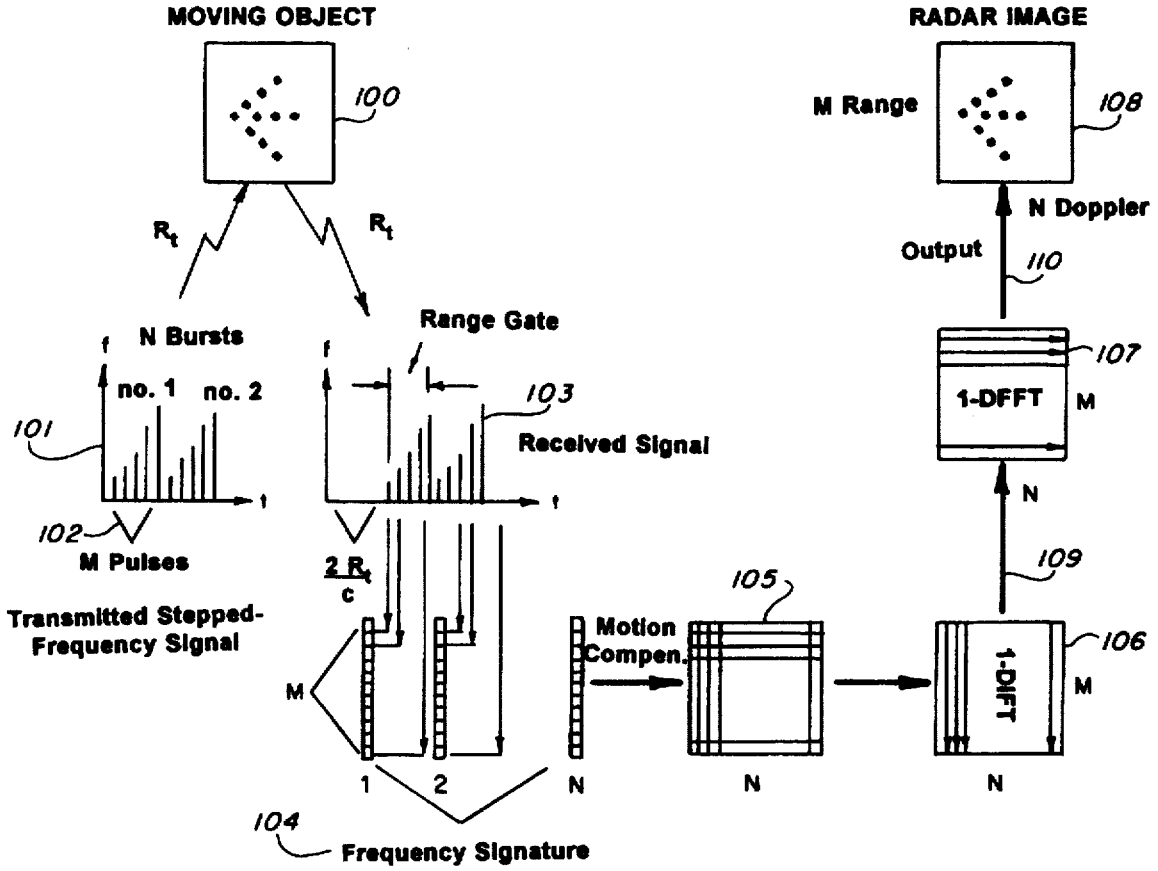

TIME FREQUENCY PROCESSOR FOR RADAR IMAGING OF MOVING TARGETS

FIELD OF THE INVENTION

The present invention relates to improvements in imaging radar. In particular, the present invention relates to deblurring, feature extraction from, and improving resolution of radar target images using improved methods.

BACKGROUND OF THE INVENTION

Radar images are widely used in many areas, such as wide area surveillance and remote sensing. Conventional radar systems may transmit electromagnetic waves to a target. The target may consists of a number of points which tend to scatter incumbent radar waves. A radar system may then receive scattered waves from a target. The scattering properties of a target may describe target features. Point scatterers may comprises discontinuities, corners, or cavities in the target. Incident radar waves are diffracted from these scatterers with different timing and different frequency dependencies as described in "High resolution parametric modeling of canonical radar scatterers with application to target identification", R. Carrierre and R. L. Moses, IEEE Trans. Antennas and Prop., 40(1) 13–18 (1992) incorporated herein by reference, and "Estimating the time-delay and frequency decay parameter of scattering components using a modified MUSIC algorithm", A. Moghaddar, Y. Ogawa and E. K. Walton, IEEE Trans. Antennas and Prop., 42(10) 1412–1418 (1994) incorporated herein by reference.

A target return signal may represent the sum of returned signals from scattering points or scatterers in the form of various geometric structures and physical features and properties of a target such as material absorption and reflectivity. A radar processor may reconstruct relative spatial distribution of target scatterers based on reflectivity. The spatial distribution of reflectivity, which may be referred to as a target's radar image may be mapped onto a range and cross-range plane representing its relative location in space. Target range may be represented by straight line distance from radar to target or radar "line-of-sight." Target cross-range is the position of a target along a dimension transverse or horizontally perpendicular to a radar's line-of-sight.

Increasingly higher resolution radar images are increasingly in demand by radar users. A larger antenna aperture may provide higher cross range resolution. Since range resolution is directly related to bandwidth of a transmitted radar signal, and cross-range resolution is determined by antenna beamwidth, a higher bandwidth, higher frequency signal and larger aperture antenna may normally be required to achieve greater resolutions. To achieve high cross-range resolution without using a large antenna aperture, synthetic array processing is widely employed. Synthetic array radar processing may coherently combine signals obtained from sequences of small apertures to emulate the result of a large aperture.

Synthetic array radar may include both synthetic aperture radar (SAR) and inverse synthetic aperture radar (ISAR). Traditionally, SAR may be associated with a moving radar unit and stationary target; ISAR may be associated with the geometrical inverse in which a target is moving and a radar unit is stationary. For ISAR, the synthetic aperture is formed by coherently combining signals obtained from a single aperture as it observes a rotating target. The rotation of the target emulates the result from a larger circular aperture focusing at the rotation center of the target.

ISAR may use Doppler information to obtain the cross-range resolution. Due to a target's rotation, which can be characterized as a superposition of pitch, roll, and yaw motions, different parts of a target may have slightly different velocities relative to a radar unit and may produce slightly different Doppler frequencies which a radar unit may then receive. Differential Doppler shift of adjacent point scatterers may be measured in the receiver; therefore, the distribution of the target's reflectivity may be characterized by the Doppler spectrum: the distribution of differential Doppler shifts. A conventional Fourier transform method may then be used to generate Doppler spectrum information.

Conventional Radar Imaging of Moving Targets

FIG. 1 is a diagram illustrating stepped-frequency inverse synthetic radar imaging of a moving target. The returned signal from moving object 100 can be represented as the integration of the returned signals from its individual scatterers as more fully described in "High Resolution Radar", D. R. Wehner, (2nd edition), Artech House, 1994.

The objective of radar processing may be to estimate the target's reflectivity density function from received baseband signal samples, the so-called frequency signature.

If the moving object 100's range is known exactly and velocity and acceleration of target's motion are constant and known exactly over imaging time duration, then the extraneous phase term of the motion can be exactly removed. Therefore, the reflectivity density function of the target may be obtained simply by taking the inverse Fourier transform of the phase compensated frequency signature. The process of estimating the target's range and removing extraneous phase term may be referred to as focusing or gross translational motion compensation, or, more commonly, aligning radar returns.

An inverse Fourier transform may be used to construct a reflectivity density function for a target. For SAR, motion compensation is facilitated by measuring actual motion of the radar platform. In ISAR, the actual motion can be measured by a range-tracker, or estimated by a motion compensation algorithm which estimates motion parameters and compensates motion with respect to the target's range, velocity, acceleration and other higher order terms. Gross translation techniques however may be inadequate to compensate for radar image blur and distortion due to non-uniform motion and target rotation because the target's velocity, hence the Doppler frequencies returned, may change from pulse to pulse. Motion compensation which would improve resolution beyond that provided by gross methods may be disadvantageous due to processing times involved. Near real time or real time processing of target data to eliminate blur and distortion may not be possible with present motion compensation processing.

ISAR imaging System may use stepped-frequency pulses to generate a wide bandwidth output. The radar unit transmits N burst sequence 101. A typical number of bursts for such a train of bursts may be 512. Each burst in N burst sequence 101 comprises M narrow-band pulses 102. A typical number of narrow band pulses may be 64. Within each burst, the center frequency f(m) of each successive narrow band pulse 102 is increased by a constant frequency step $\Delta f$. The total bandwidth of a burst in burst sequence 101, i.e., M times the frequency step $\Delta f$, determines radar range resolution. The total number of bursts N for a given imaging time duration may determine Doppler or cross-range resolution. The returned pulse is heterodyned and quadrature detected in the radar receiver.

To form a radar image 108 after collecting the returned signals, M-by-N complex data are organized into two-dimensional arrays which represent unprocessed spatial frequency signatures 104 of moving object 100. Received frequency signatures 104 may be treated as a time history series of moving object 100's reflectivity at each discrete frequency. A radar processor uses frequency signatures as raw data to perform range processing and Doppler processing. Range processing functions and associated time history series acts as a matched filter of the kind used for pulse compression. Such matched filtering removes frequency or phase modulation and resolves range. For stepped-frequency signals, range processing performs an M-point inverse discrete Fourier transform (IDFT) 106 for each of the N frequency signatures 104 received. N range profiles 109 representing distribution of target reflectivities in range, each containing M range cells, may be obtained. For each range cell, N range profiles 109 constitute a new time history series, which is sampled at baseband to form N in-phase (I-channel) and N quadrature-phase (Q-channel) data sets. The echoes from each burst are used to calculate target range by any known technique. Thereafter, the echoes from the N bursts are aligned in time. In practice, most objects of interest will have plural reflective facets recessed from one another along the line of sight of a radar transmitter: for example, a radar pulse launched at a radially incoming airplane would first reflect from the plane's nose, then separately from each wing, then from the tail. Because the round trip time between the radar emitter and each reflective facet differ, the echoes arrive back at slightly different times. However, this echo pattern will repeat from burst to burst, and these patterns are readily time-alignable with one another, much in the same manner that Astronomers align atomic spectra from stars with those known on earth in order to infer red shift.

Doppler processing may then be used to take a discrete Fourier transform (DFT) 107 of range profiles 109 comprising time history series representing a frequency signatures 104 and generate an N-point Doppler spectrum, or Doppler profile 110. By combining N-point Doppler spectra at M range cells, an M-by-N radar image 108 may be formed. Radar image 108 may represent the target's reflectivities mapped onto the range-Doppler plane.

Conventional ISAR processing may use a Fourier transform to retrieve Doppler spectrum information. In order to use Fourier transform methods properly to generate Doppler spectrum, some restrictions must be applied. Fourier transforms for Doppler processing are adequate only when point scatterers remain in their range cells and their Doppler frequency shifts are constant during the entire observation time. If point scatterers drift through range cells as a result of motion, or associated Doppler frequency shifts are time-varying as a result of motion, a target image constructed therefrom may become blurred. Motion compensation may be used for establishing aligned range and for keeping constant phase change-rate for each individual point scatterer.

While a target is moving smoothly, conventional motion compensation may be good enough to produce a clear target image. However, when a target exhibits complex motion, such as fast maneuvering, conventional motion compensation applied to an entire target may not be sufficient to produce an acceptable image for viewing and analysis.

With large motion residues or phase errors, individual scatterers may still drift through their range cells; the associated Doppler spectrum may still be time-varying. Fourier transform methods applied on such time varying data result in a blurred target image. In order to achieve satisfactory results with the application of Fourier methods for motion compensation, Doppler frequency contents data should not change with time. In radar target imaging however, target speeds in both range and cross-range directions may be high and a requirement for time invariance in Doppler frequency contents may be more difficult to meet especially considering higher sampling rates required by higher resolution systems. Such requirements present a distinct disadvantage in radar image processing. A method would be desirable which lifts restrictions for stationary Doppler frequencies while allowing greater resolution of a target image. A method would be desirable which uses other than Fourier transform methods.

SUMMARY AND OBJECT OF THE INVENTION

Accordingly, an object of the invention is to enhance resolution of radar images, to eliminate smearing of radar images, and to eliminate the necessity of using Fourier methods by applying joint time-frequency transforms to radar imaging to achieve superior image resolution and to extract features of radar targets.

In accordance with these and other objects made apparent hereinafter, the invention concerns performing an N point joint time-frequency transform of the M×N time aligned echo data, rather than a single one. Although this reduces image intensity, because echo energy from the target is spread through a large domain, (time and frequency, rather than just frequency), these images will lack the blurring common in images generated by the conventional approach caused by variations in Doppler echo frequencies from burst to burst. The preferred time-frequency transform is a cross-term reduced Wigner-Ville distribution, such as the Time-Frequency Distribution Series, because of its potentially high resolution.

DETAILED DESCRIPTION OF THE DRAWINGS

Time-frequency transforms

In accordance with the present invention, conventional Fourier transform processing is replaced by time-frequency transform processing. Many high resolution time-frequency transform are useful in embodying the method of present invention. Time-frequency transforms include linear transforms, such as the short-time Fourier transform (STFT) and wavelet transforms, and bilinear transforms such as the Wigner-Ville distribution.

Wigner-Ville distribution transforms have better characteristics for processing time-varying spectrum than the linear transforms and may be used in one embodiment of the present invention. However, Wigner-Ville distribution transforms suffer from cross-term interferences, which significantly interfere with application of bilinear time-frequency transform methods. To reduce the cross-term interference, a Wigner-Ville distribution transform applied to time-varying spectrum in another embodiment can be filtered which while reducing time-frequency resolution also reduces undesirable cross-term interferences. Wigner-Ville distributions with linear low-pass filter are characterized as a Cohen's class transform as described in "Time-Frequency Analysis", L. Cohen, Prentice Hall, 1995 incorporated herein by reference, and the distributions with non-linear low-pass filter is called the time-frequency distribution series (TFDS) "Decomposition of Wigner-Ville distribution and time-frequency distribution series", S. Qian and D. Chen, IEEE Trans. on Signal Processing, 42(10), 2836–2842 (1994).

In yet another embodiment, adaptive time-frequency transforms such as adaptive spectrogram transforms as described in "Signal representation using adaptive normalized Gaussian function", S. Qian and D. Chen, Signal Processing, 36(1) 1–11 (1994), incorporated herein by reference, and matching pursuit transforms as described in "Matching pursuit with time-frequency dictionaries", S. Mallat and Z. Zhang, IEEE Trans. on Signal Processing, 41(12) 3397–3415 (1993), incorporated herein by reference, are also high resolution time-frequency decompositions. Such adaptive time-frequency transforms decompose a signal into a family of Gabor elementary functions which may be further characterized as Gaussian-modulated, exponential functions which are very well localized in both the time and the frequency domain and adaptable to match the local behavior of the analyzed signal.

Correction of time-varying Doppler frequency

Figure 1:
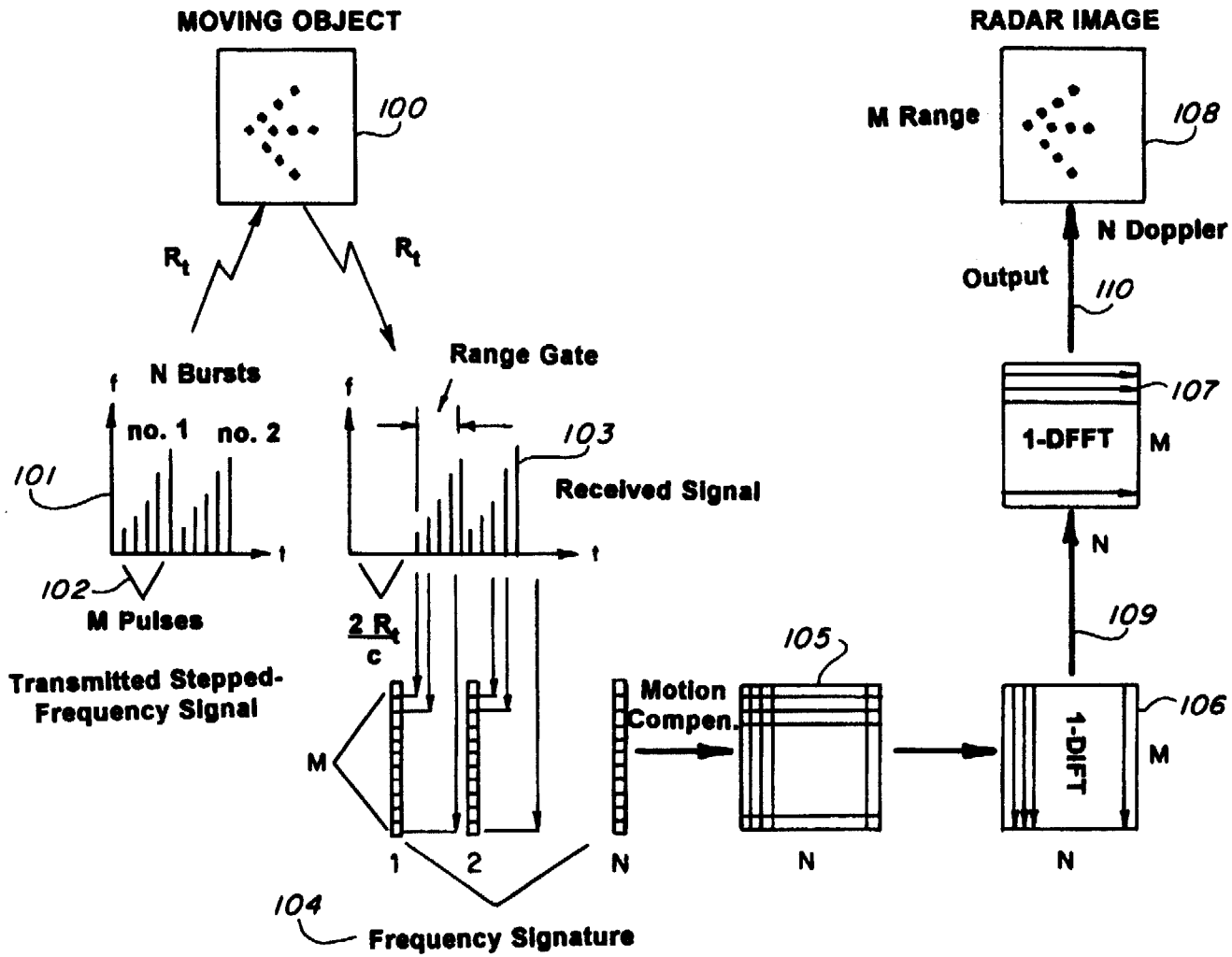
FIG. 1 is a diagram illustrating stepped-frequency inverse synthetic radar imaging of a moving target.
Figure 2:
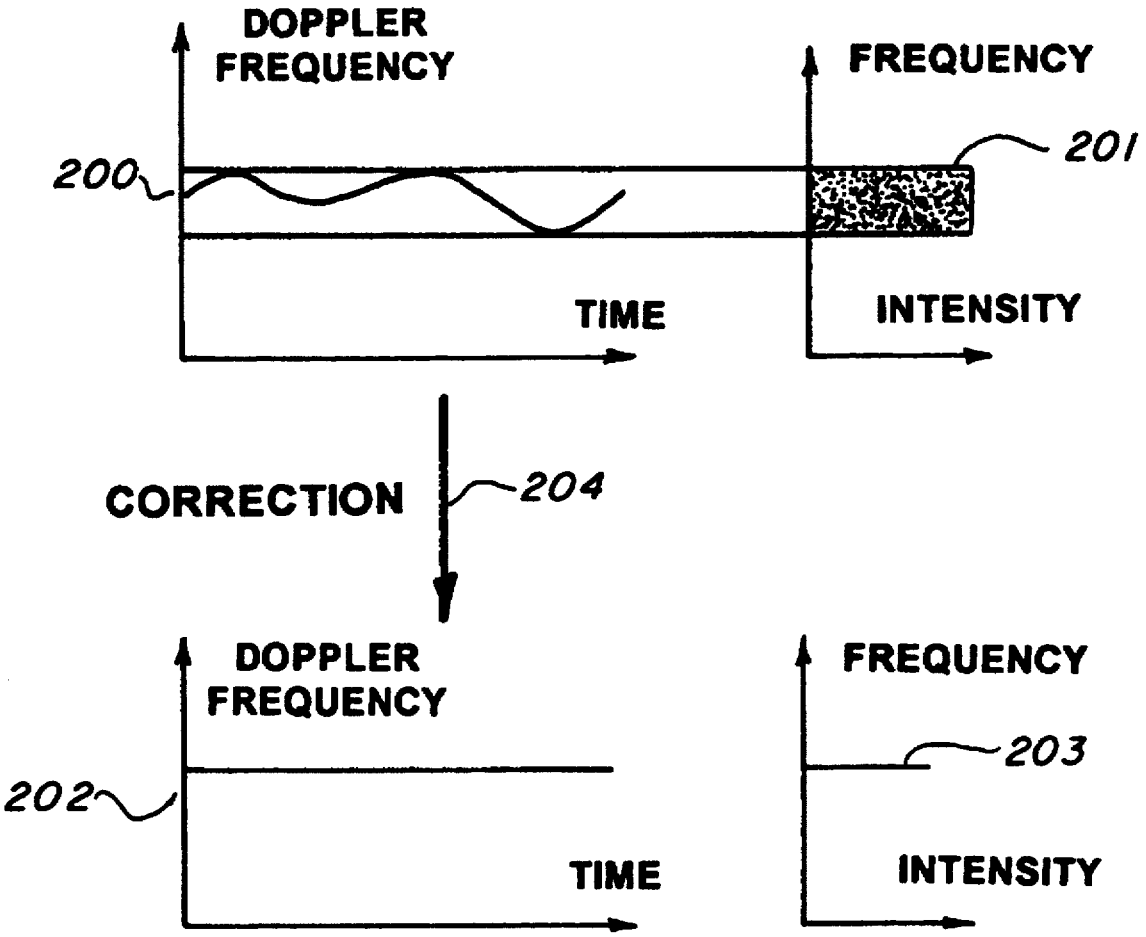
FIG. 2 is a diagram illustrating use of instantaneous frequency estimation for generating constant Doppler spectrum.

Fourier processing is based on constant Doppler spectrum associated with a constant target rotation rate. However, in general, the change in target's aspect angle may be non-uniform due to target's non-uniform rotation. Therefore, the Doppler frequencies become time-varying. FIG. 2 is a diagram illustrating use of instantaneous frequency estimation for generating constant Doppler spectrum.

For a single point scatterer, time-varying Doppler frequency 200 may be corrected by estimating the instantaneous frequency distribution 201 with a time-frequency transform. A resulting time-dependent phase correction factor 204 can be applied to reshape the Doppler frequency spectrum 202 rendering the Doppler spectrum 203 for the single scatterer time-invariant. However, for complex targets which consist of many scatterers, phase corrections for these individual scatterers are very complicated.

Replacing Fourier transform with time-frequency transform

Figure 3:
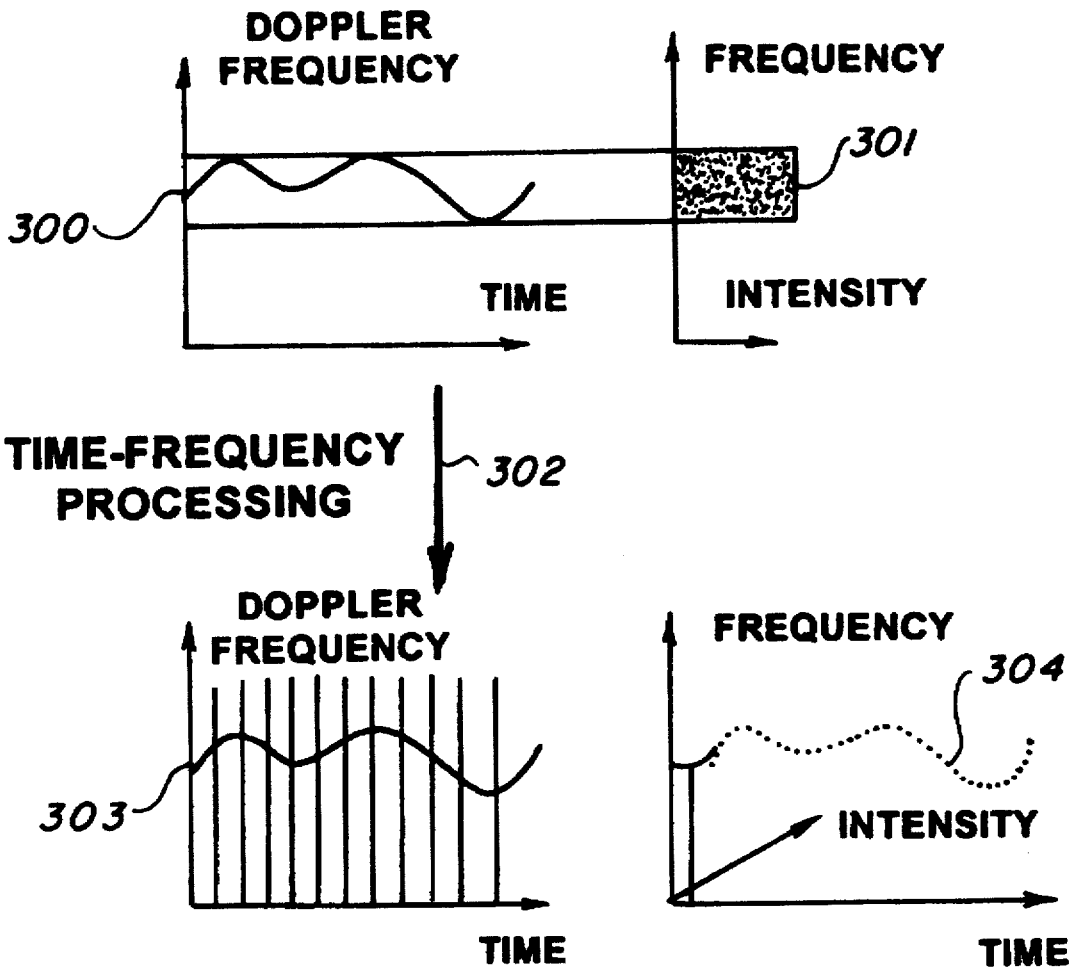
FIG. 3 is a diagram illustrating joint time-frequency transform for generating superior image resolution.

Inherent limitations of Fourier transform processing can be overcome by replacing tertiary Fourier transform processing of Doppler spectrum with high resolution time-frequency transform processing. Fourier transform processing may still be useful in early processing of target data and may be present without interfering with time-frequency processing. Because of undesirable effects associated with time-variance in the Doppler spectrum, an efficient method to solve the problem of smeared Fourier spectrum and blurred image the preferred embodiment of the present invention applies a high-resolution time-frequency transform to Doppler processing. FIG. 3 is a diagram illustrating joint time-frequency transform for generating superior image resolution.

Time-frequency processing 302 may, in the present invention, be applied to Doppler frequency signature 300 to decompose residual phase errors into instantaneous time slices 303. At each time slice or time instant, Doppler frequency components 304 are fixed. Thus, time relative range cell drift and Doppler frequency shift are eliminated for each scatterer. By examining motion of individual scatterers at successive time instants using high resolution time-frequency transforms there is no scatterer overlapping; therefore, no image blurring occurs. Further details are described in "Radar ambiguity function, time-varying matched filter, and optimum wavelet correlator", V. C. Chen, Optical Engineering, 33(7), 2212–2217 (1994) incorporated herein by reference, "Reconstruction of inverse synthetic aperture radar image using adaptive time-frequency wavelet transform", V. C. Chen, SPIE Proceedings on Wavelet Applications, 2491, 373–386 (1995) incorporated herein by reference, and "Radar range-Doppler imaging", V. C. Chen, Chapter 10 in "Introduction to Joint Time-Frequency Analysis—Methods and Applications", S. Qian and D. Chen, pp. 214–229, Prentice Hall (1996) incorporated herein by reference. Since each scatterer has its own range and its own Doppler shift at each time instant a complete and instantaneous target image can be generated.

Figure 4:
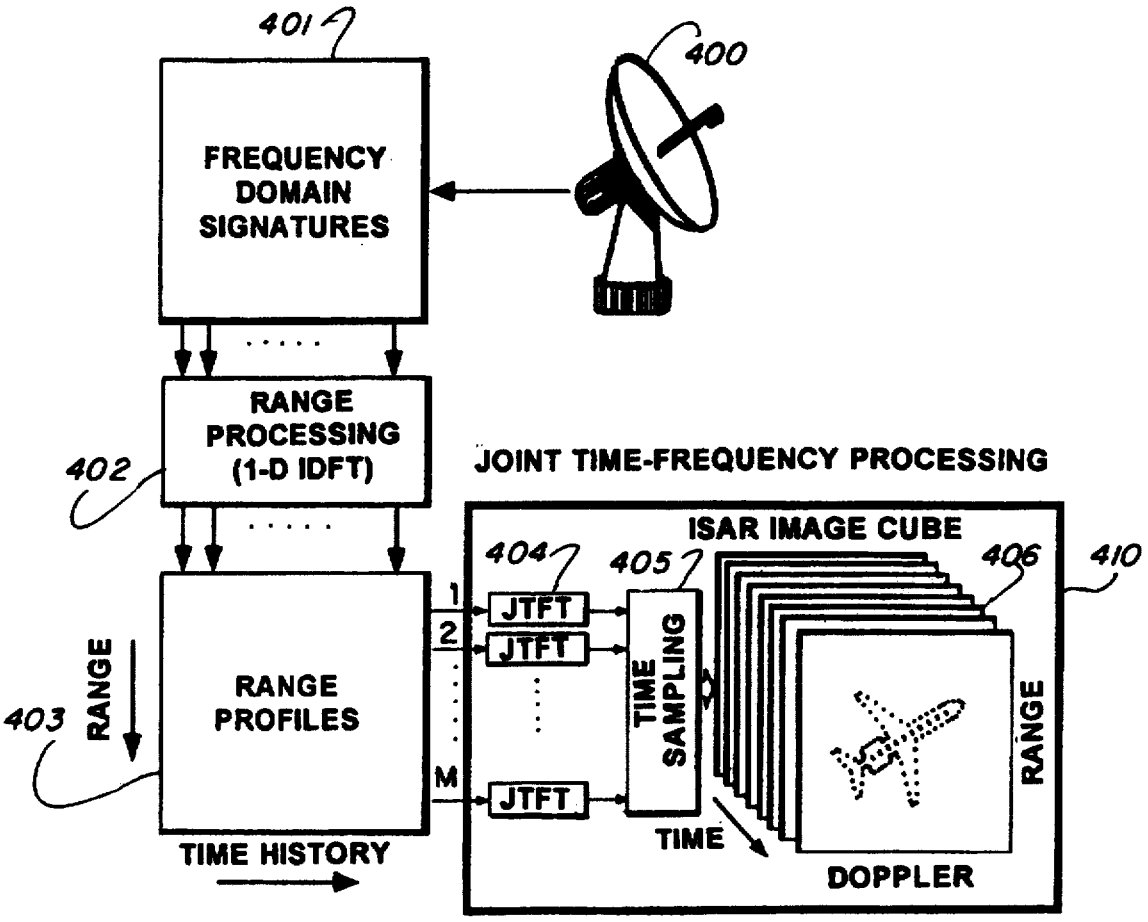
FIG. 4 is a block diagram illustrating inverse synthetic aperture radar using joint time-frequency transforms.

By replacing the conventional Fourier transform with a joint time-frequency transform, a 2-D range-Doppler Fourier frame becomes a 3-D time-range-Doppler cube. FIG. 4 is a block diagram illustrating inverse synthetic aperture radar using joint time-frequency transforms. Radar receiver 400 inputs raw radar pulse signals so that frequency domain signatures 401 may be obtained. Range Processing 402 may apply a 1 dimensional IDFT to achieve global motion compensation by removing extraneous phase component due to motion. N Range profiles 403 for M range cells may be generated by Range Processing 402. Range Profiles 403 may be input into M Joint Time-Frequency Processors 404. By applying time sampling 405 to the output of Joint Time-Frequency Processors 404 in time, a time sequence of 2-D range-Doppler images can be viewed. Each individual time-sampled image frame from ISAR Image Cube 406 provides not only higher resolution but also the temporal information within each frame.

Figure 5:
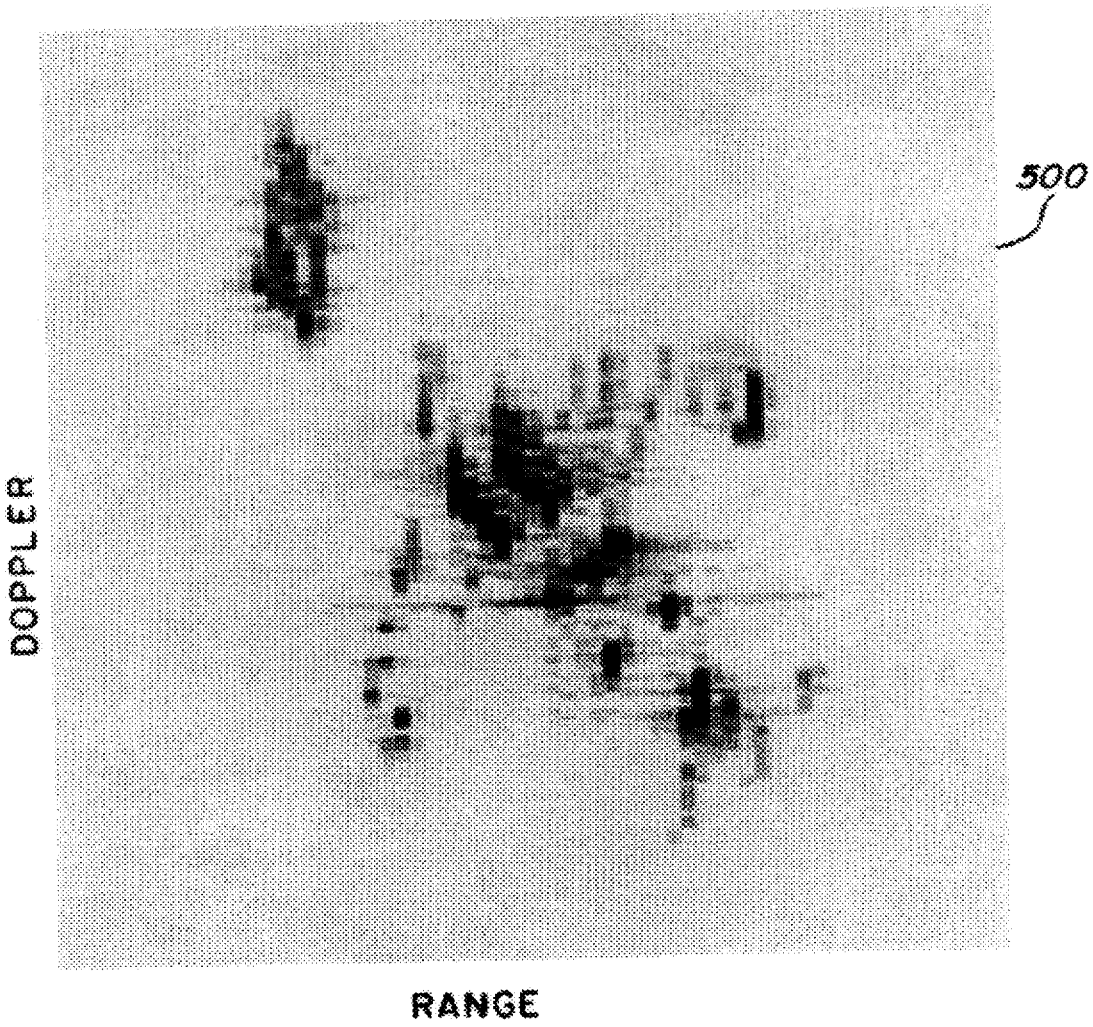
FIG. 5 is an illustration of a radar image of an aircraft with uncompensated phase errors resulting from use of prior art Fourier methods.

From a time-varying spectrum point of view, the uncompensated phase error causes the Doppler spectrum to be time-varying. As previously described, processing the time-varying Doppler spectrum using conventional Fourier transform processing, the target image becomes blurred. FIG. 5 is an illustration of a radar image of an aircraft with uncompensated phase errors resulting from use of prior art Fourier methods. In this example, a simulated aircraft with a velocity fluctuation is used. By replacing the Fourier transform with a time-frequency transform, the single image frame 500 is resolved into a stack of its temporal frame elements. For each temporal frame element, its range-Doppler resolution is higher than the Fourier-based image.

Figure 6:
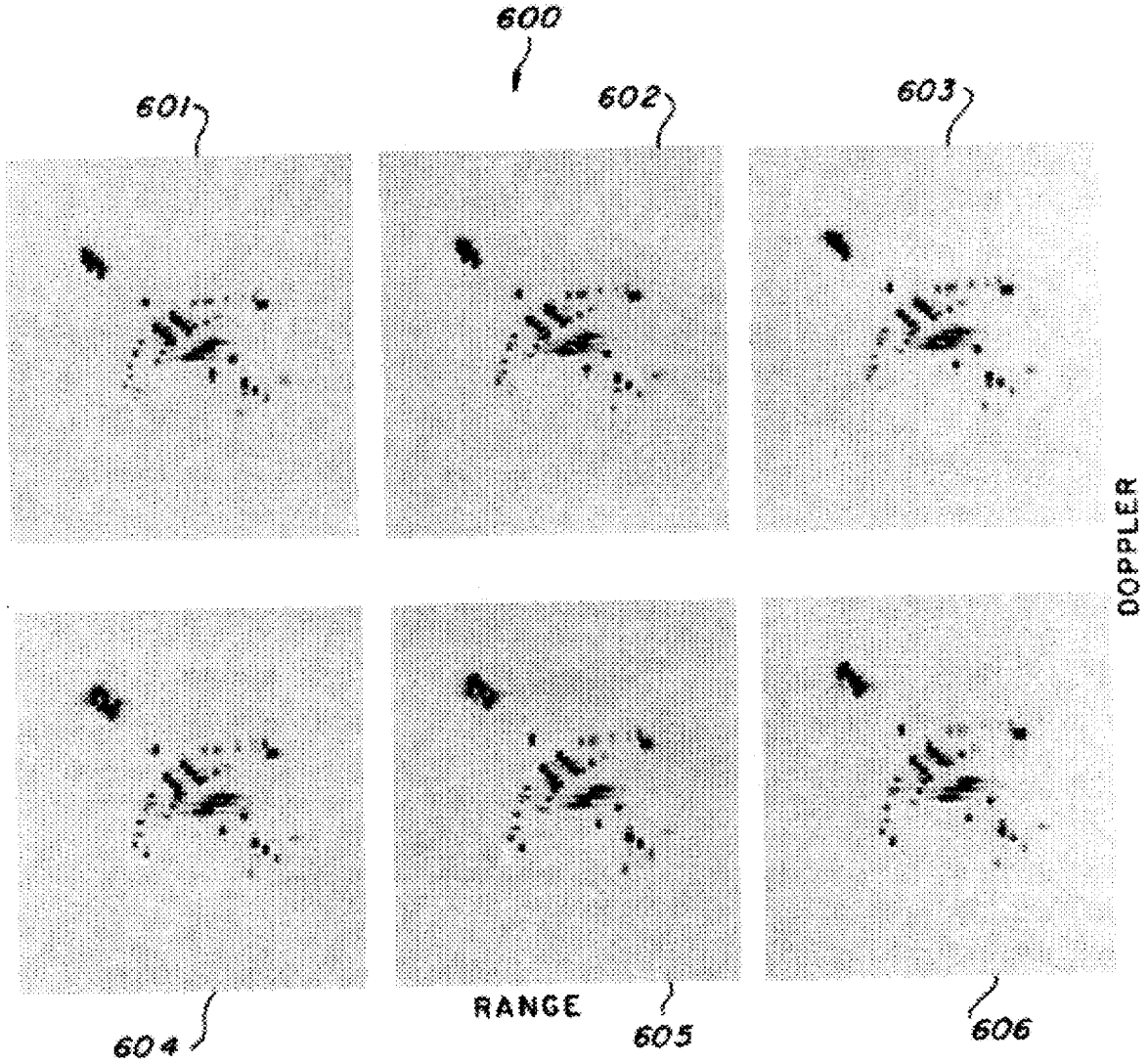
FIG. 6 is an illustration of a radar image sequence of an aircraft using joint time-frequency processing.

FIG. 6 is an illustration of a radar image of an aircraft using joint time-frequency processing. 600 shows a sequence of time-sampled frames from an image sequence constructed using joint time-frequency transform. By using joint time-frequency transform processing, time-varying spectrum can be represented with better clarity. A Fourier based image 500, previously smeared, is resolved into a sequence of time-varying images 601 through 606, which has superior resolution and shows temporal information associated with changing range and Doppler information. In the sequence of frames, Doppler changes from one frame to another can be easily seen, especially for point scatterers smeared in Fourier-based image 500.

Advantage of the time-frequency Doppler processing

If a target has rotating parts, such as a propeller or antenna, the Fourier-based image of such a target may have strong strip lines along the Doppler axis. However, joint time-frequency Doppler processing transforms strip lines into pairs of dots moving with a small displacement up and down along the Doppler axis. Dots from two different frames of a temporal range-Doppler image sequence provide information about the relative rotation rate of such parts, which may be useful for target identification.

While such additional information may be advantageous, joint time-frequency processing provides slightly less resolution than Fourier methods applied to targets displaying optimum characteristics. Advantages associated with joint time-frequency processing are in direct proportion to magnitude of target movement. Large magnitudes of motion, as previously mentioned, render such targets less susceptible to Fourier processing. In a case where perfect motion compensation for individual scatterers is possible: each scatterer remaining in its range cell with time invariant Doppler frequency, the Fourier transform may achieve a resolution which is better than that possible for the same target using joint time-frequency processing. However, perfect motion compensation is rarely achievable. Joint time-frequency based processing therefore exhibits the following advantages over conventional Fourier transform methods:

(1) Does not limit target point scatterers to the same range cells with constant Doppler shift.

(2) No need for complex, processor resource intensive motion compensation processing for individual point scatterers.

(3) If complex motion compensation has been applied to individual point scatterers with marginal results, joint time-frequency transform processing can still be applied to de-blur target image.

(4) Joint time-frequency processing for ISAR imaging is a natural way to process moving targets with non-uniform motion or rotation and is a more efficient than complex motion compensation processing.

(5) Joint time-frequency processing allows radar imaging of multiple targets.

(6) Joint time-frequency processing allows SAR imaging of moving ground targets.

I claim:

1. In a radar image signal processing system, an improved method for processing radar target image information comprising:

generating a series of pulses for transmission in a target range, receiving target image backscatter information generated from said series of pulses transmitted in said target range by reflecting from a target in said target range, and processing said target image backscatter information received in said receiving step into target information using a series of processing steps comprising:

generating frequency domain signatures from said target image backscatter information, range processing said frequency domain signatures and generating first transformed target information, receiving said first transformed target information and generating target range profiles therefrom, performing a Joint Time-Frequency Transform upon said target range profiles and generating second transformed target information, sampling said second transformed target information in the time domain and generating time sampled target information, and displaying a target image using time sampled target information.

2. The method of claim 1, wherein said series of pulses further comprises individual narrow band pulses of increasing frequency.

3. The method of claim 1, wherein said target image backscatter information further comprises target image backscatter information from a plurality of point scatter sources on said target.

4. The method of claim 1, wherein said step of range processing further comprises removing a motion component further comprises removing extraneous phase term from a spatial frequency signature of said target.

5. The method of claim 4, wherein said step of range processing further comprises removing said motion component using an Inverse Discrete Fourier Transform.

6. The method of claim 1, wherein said first transformed target information further comprises N range profiles.

7. The method of claim 6, wherein said target range profiles further comprise M target range profiles comprising N range profiles.

8. The method of claim 1, wherein said step of performing a Joint Time-Frequency Transform upon said target range profiles and generating second transformed target information further comprises performing M Joint Time-Frequency Transforms upon M target range profiles and generating M groups of said second transformed target information.

9. The method of claim 8, wherein said step of sampling said second transformed target information in the time domain and generating time sampled target information further comprises sampling said M groups of said second transformed target information and generating M frames of said time sampled target information.

10. The method of claim 9, wherein said step of displaying a target image using time sampled target information further comprises displaying an enhanced target image in the Range Doppler plane, said target image comprising M frames of said time sampled target information displayed on a display over a predetermined time interval.

11. A radar system comprising:

means for generating a plurality of radar bursts, each said burst comprising a plurality of radar pulses;

means for receiving echoes of said pulses in said bursts;

means for time aligning pulses across said bursts to form an aligned echo data base; and means for transforming said aligned echo database by a preselected joint time-frequency transform.

* * * * *